Aug. 18, 1964   E. V. GARNER   3,144,784
CENTERING OF ROTARY MEMBERS
Filed Feb. 3, 1961
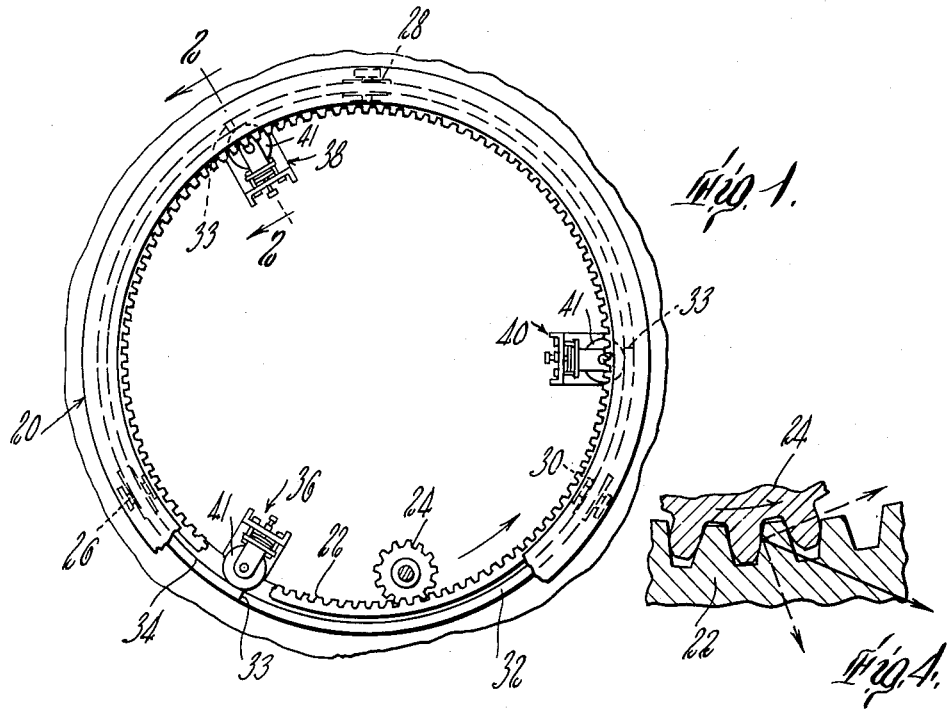
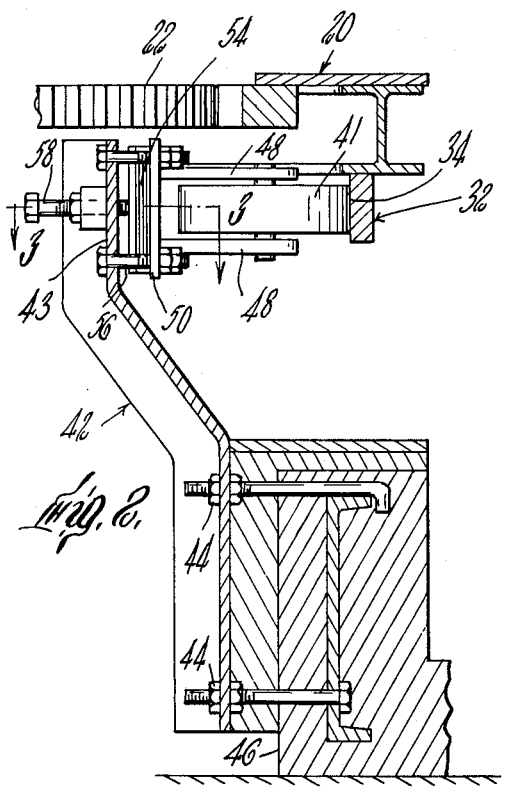
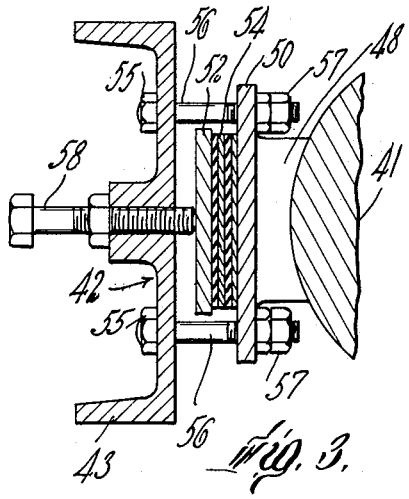

United States Patent Office 3,144,784
Patented Aug. 18, 1964

3,144,784
CENTERING OF ROTARY MEMBERS
Edward V. Garner, East Walpole, Mass., assignor to Bird Machine Company, South Walpole, Mass., a corporation of Massachusetts
Filed Feb. 3, 1961, Ser. No. 86,949
6 Claims. (Cl. 74—411)

This invention relates to rim-centered rotary members and more specifically to improvements in the centering of such members. The invention has particular importance to massive, annularly supported, rotary members, such as turntables, giant radar antennae, foundry casting wheels and rotary filters.

Rotary members receive various lateral forces which tend to carry them off-center. One such force occurs with an involute gear drive where a large gear joined in axial alignment to a rotary member is driven by a pinion. Because pinion involute gear teeth act through a line of force disposed at an angle to the tangent of the large gear pitch circle, a lateral off-centering force component perpendicular to the tangent occurs. The tangent force component also produces an off-centering effect if it is not balanced by a force of opposite sense acting on the rotary member to provide a perfect couple about the center, as occurs where frictional drag in the rotary support of a rotary member varies from point to point.

A circular centering rim and spaced-apart guide members engaged on the rim are generally employed with a rotary member for opposing such off-centering forces to keep it in place. Such a rim is of the form of a surface of revolution such as a cylinder adapted to transmit lateral forces. Where a rim is integral with its rotary member, the spaced-apart guide members preferably take the form of a multiplicity of caster rollers, each mounted to turn on a vertical axis. A centering rim may be on the order of 25 feet in diameter, a size virtually impossible to machine to circularity; in all events the expense of grinding, machining or otherwise forming large rims to close tolerences of circularity is always great and often prohibitive.

A practical centering rim may be comprised, for instance, of a plurality of shaped steel members in the form of cylindrical arc segments which are joined together in the field. Variations from perfect circularity of plus and minus $\frac{1}{16}$ inch or more necessarily occur due to the inaccuracies of the shaping operation of the individual segments and to the joints. The shaping operation or the assembly in the field can also cause twisting of the individual segments so that some portions of a segment may depart from the desired surface form. Thus, in a cylindrically designed rim, portions of it may be conical in one direction or the other. Because of these variations, such centering rims themselves tend to cause their rotary members not to run true, producing problems of severe wear and structural design which have significantly influenced the costs of fabrication and maintenance. When a guide member is engaged with a rotary member centering rim having an imperfection such as a ridge, and upon relative movement, the ridge in the rim reaches this guide member, an off-centering force is applied to the rotary member by the ridge which can overcome friction and cause the rotary member to slide laterally a slight distance on its support to accommodate passage of the ridge past the guide member. To allow for operation without binding of such irregular rims, it has heretofore been necessary to position the guide members slightly away from the ideal perfect circle of the centering rim so that they would allow for passage of the imperfections. Thus, a rotary member has been permitted to move back and forth between its guide members with no accurate guided return of the rotary member to substantial axial alignment. The rotary member supports are thus continually subjected to sliding wear, and the guiding members and their supporting structure have beenn required to be very strong to provide forces sufficient to slide the rotary member.

Principal objectives of this invention are to provide a simple and inexpensive rotary member which runs substantially true; to permit the use of a centering rim having variations from circularity, without causing substantial shifting of the rotary member; to decrease the cost of rims and guiding members and their supporting structure; and to provide generally improved rim centering of rotary members.

My invention is the combination of a rotary member, a centering rim, and a means for guiding on the centering rim for positioning the rotary member relative to a desired axis of rotation including a guide member engaged with the rim, having a preloadable, resilient support which, when preloaded, holds the guide member in firm, guiding engagement with the rim for opposing off-centering forces in the range of the preload forces, while it resiliently yields in response to off-centering forces in excess of the preload value, which correspond to the loads which tend to overcome the sliding friction and inertia of the rotary member. For best results three or more of such guide members are spaced about the rim but for instance in the case of existing structures having a multiplicity of conventional rigidly mounted rollers it is possible to replace one or more of the conventional guiding members when deteriorated with resilient preloadable ones according to the invention. The principal advantage obtained in the latter event is that of decreasing the load the support must bear, thus making the support lighter and more economical to construct.

While the invention is described with reference to the preferred embodiment where the rim is joined to a rotary member, and the guide members are mounted on fixed supports, certain of the advantages of the invention can be obtained where the members are reversed, with the centering rim fixed and the guide members mounted to the rotary member.

In the drawings:

FIG. 1 is a partially cut-away plan view of the preferred embodiment;

FIG. 2 is a larger scale vertical section through a centering member taken on line 2—2 of FIG. 1;

FIG. 3 is a still larger scale, horizontal section of the centering members support taken on line 3—3 of FIG. 2; and FIG. 4 is a diagrammatic sectional view of the drive gears shown in FIG. 1.

Referring to the drawings, an annulus 20 having a large diameter, for instance, in excess of 20 feet is shown diagrammatically. While no superstructure is shown, the annulus does support an assembly, together comprising a massive rotary member.

An internal, involute gear 22 is joined to the annulus. It is meshed with pinion 24, the latter being mounted on a fixed support and driven by a means not shown. A plurality of load-bearing rollers represented at 26, 28, and 30 are disposed below the annulus and a rail member 32 of the annulus rides upon the rollers for rotary support. This rail member is formed of a multiplicity of steel arc segment bar members joined end to end at butt joints 33 in a circle. The inner surface of rail member 32 provides a cylindrical rim 34 which is generally circular but has variations on the order of plus and minus $\frac{1}{16}$ inch from perfect circularity, and slight degrees of twist from a perfect cylinder.

A multiplicity of rotatable centering guide members 36, 38 and 40 are arranged to engage the rim. Each as shown comprises a caster roller 41 supported on a mounting portion 43 of a rigid angle support 42 which is bolted at 44 to fixed structure 46. Each roller is mounted to turn about a vertical axis between brackets 48 which are rigdly secured to a load plate 50. The load plate is joined in a lateral load-transferring relation to mount 43 of angle support 42 through a preloadable, resilient member provided with a preload means. In this embodiment the preloadable, resilient member comprises a lamination of rubber and fiber glass 54 which is engaged face to face with the load plate 50. The preload means comprise heads 55 of bolt members 56 which bear against mount 43, the bolts extending loosely through mount 43 and load plate 50 to nuts 57 which limit permitted movement of plate 50 away but permit plate movement toward mount 43. A preload pressure plate 52 in direct load-transferring relation to mount 43 is engaged on the face of the resilient compressive member opposite from the face engaged with load plate 50. Preloading by pressure plate 52 and load-transferring to mount 43 are performed as shown by a single device comprising an adjustment bolt 58 threadably engaged with mount 43, extending into contact with preload pressure plate 52 to impart forces thereon acting towards load plate 50.

The operation of the invention is as follows: While rail 32 supports the massive rotary member upon rollers as shown in FIG. 1 at 26, 28 and 30, the pinion 24 drives the rotary member relative to supporting structure. Referring to FIG. 4, the pinion force acting on the large gear tends to force the rotary member off-center.

The centering guide members 36, 38 and 40 in preloaded condition are engaged upon the inner rim surface 34. The off-centering pinion force does not exceed the value of preloading, and so far as the pinion is concerned, the guide members appear inflexibly mounted to the fixed structure. The massive rotary member is thus constrained to rotate about its center through guiding on the circular rim. But when a substantial imperfection in the rim surface reaches a guide member, for instance, a ridge variation of 1/16 inch from true circularity, the centering rim itself tends to force the massive rotary member laterally out of position. The force needed to move the massive rotary member would have to overcome both its inertia and the total friction caused by its weight. This force is greatly in excess of the pinion forces, and due to selected adjustment of bolts 58, each of the resilient members is preloaded into a range between the two different kinds of off-centering forces. Thus, instead of the massive rotary member being forced off-center by rim variations, each resilient member 54 compresses when a ridge is engaged with its roller 41, load plate 50 moving away from the rim 34 with roller 41, and the ridge is accommodated without moving said rotary member off-center.

Similarly, where the rim 34 is twisted at a point so as to be conical in either direction, the part of the roller engaged on the conical rim portion closest to said guide member is permitted to move to accommodate the imperfection, through resilient yielding on that side of the resilient member 54, since the load on that side will exceed the preloading. Thus, the axis of the roller is shifted from the vertical so that the roller surface corresponds to that of the rim and wear on both the rim and the roller assembly is avoided. This is permitted by the flexibility of the preload means, which does not bind when uneven loads are exerted on said load plate, but rather is adapted to permit twisting thereof with corresponding compression of one side of the compressible member.

While the full advantages of the invention are achieved when each of the rotatable guide members includes a preloadable resilient support, a degree of advantage can be achieved where only one or more but less than all of the guide members are of this construction.

Certain of the details of the above described structure can be varied within the spirit and scope of the invention, as set forth in the claims.

What is claimed is:

1. In combination with a rotary member, support means supporting said rotary member for rotation about a predetermined axis, a fixed support member adjacent said rotary member, a substantially circular centering rim on one of said members concentric with said axis, and a centering means mounted on the other of said members and engaging said rim for centering the rotary member about said axis, said centering rim having at least one imperfection exposed to engage said centering means, said rotary member having a drive mechanism which can apply an off-centering force of a given magnitude thereto, said rotary member requiring the application of an off-centering force of a greater magnitude before said rotary member can be shifted laterally to permit the passing of said imperfection, said centering means comprising a multiplicity of spaced-apart guiding members engaged on said rim including at least one guiding member having a preloadable resilient support member to which said guiding member is mounted, and a pre-load means cooperating with said resilient support member for imposing a limited pre-load of a magnitude between the magnitude of said two forces thereon whereby the off-centering influence of said drive mechanism is resisted and said rotary member is centered, while movement of said guide member to accommodate said imperfection in said rim is permitted without lateral movement of said rotary member.

2. The combination of claim 1 wherein said centering rim is joined to said rotary member, said resilient support for said guiding member is mounted to said fixed support member, and said guiding member includes a roller engaged on said rim.

3. The combination of claim 1 wherein said guiding member comprises a roller mounted on said resilient support member for rotation about a generally vertical axis and engaged on said rim, said rim having a vertical axis, said preloadable support comprises a resiliently compressible member, and said preload means comprises a load plate engaged on one side of said resiliently compressible member to which said guiding member is rotatably mounted, a pressure plate means engaged on the opposite side of said resiliently compressible member, and means for forcing said plates together, the pressure plate side of said resilient member being in a direct load transferring relation to supporting structure.

4. The combination of claim 3 wherein said compressible member and said preload means are adapted to permit resilient compression relative to other portions of said compressible member of the portion of said compressible member corresponding with each side part of said roller, to permit shifting of the axis of said roller from vertical alignment when a said side part of said roller is engaged on a corresponding rim surface portion which deviates towards said guide member, relative to other portions of said rim.

5. In combination with a massive rotary member, support means supporting said rotary member for rotation about a predetermined axis, a fixed support member adjacent said rotary member, a substantially circular centering rim on one of said members concentric with said axis, and a centering means mounted on the other of said members and engaging said rim for centering said massive rotary member about said axis, said centering rim having at least one imperfection exposed to engage said centering means, said rotary member including means that tends to apply off-centering forces less than a given magnitude to said rotary member, said rotary member requiring the application of an off-centering force of a greater magnitude before said rotary member can be shifted laterally to permit the passing of said imperfection, said centering means comprising a multiplicity of spaced-apart rotatable guiding members engaged with said rim, and a corresponding plurality of pre-loadable, resilient lateral supports to which said guiding members are rotatably mounted, means for pre-loading each support to a magnitude between said two magnitudes given above whereby the rotary member is centered while movement of said guide members to accommodate said imperfection in said rim is permitted without lateral movement of said rotary member.

6. The combination of claim 5 wherein at least some of said guiding member, lateral, resilient supports comprise resiliently compressible members.

References Cited in the file of this patent

UNITED STATES PATENTS

| | | |
|---|---|---|
| 1,649,739 | Rosselle | Nov. 15, 1925 |
| 2,040,841 | Fraser | May 19, 1936 |
| 2,337,863 | Beeler | Dec. 28, 1943 |
| 2,441,901 | Petersen | May 18, 1948 |
| 2,980,373 | Pyles | Apr. 18, 1961 |

FOREIGN PATENTS

| | | |
|---|---|---|
| 458,494 | Italy | July 18, 1950 |
| 504,808 | Italy | Dec. 14, 1954 |
| 825,634 | Great Britain | Dec. 16, 1959 |